(12) United States Patent
Chang et al.

(10) Patent No.: US 12,381,470 B2
(45) Date of Patent: Aug. 5, 2025

(54) POWER SUPPLY SYSTEM

(71) Applicant: Richtek Technology Corporation, Zhubei (TW)

(72) Inventors: Wei-Hsu Chang, Hsinchu (TW); Ta-Yung Yang, Taoyuan (TW); Shih-Ho Hsu, New Taipei (TW); Mao-Hui Kuo, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 248 days.

(21) Appl. No.: 18/156,453

(22) Filed: Jan. 19, 2023

(65) Prior Publication Data

US 2023/0268825 A1 Aug. 24, 2023

Related U.S. Application Data

(60) Provisional application No. 63/312,405, filed on Feb. 22, 2022.

(30) Foreign Application Priority Data

Jul. 11, 2022 (TW) .................................. 111125979

(51) Int. Cl.
*H02M 1/00* (2007.01)
*H02M 1/42* (2007.01)
(Continued)

(52) U.S. Cl.
CPC ......... *H02M 1/0032* (2021.05); *H02M 1/007* (2021.05); *H02M 1/10* (2013.01);
(Continued)

(58) Field of Classification Search
CPC ...... H02M 1/08; H02M 1/007; H02M 1/0032; H02M 1/10; H02M 1/42–4291; H02M 3/335–33592
See application file for complete search history.

(56) References Cited

U.S. PATENT DOCUMENTS 10,158,282 B1 *   12/2018   Maruyama ............... H02M 1/36
2007/0145956 A1 *  6/2007   Takeuchi ............ H02M 1/4225
                                                              323/207

(Continued)

FOREIGN PATENT DOCUMENTS

JP         2004215433  A  *  7/2004   ..........  H02M 1/4225

OTHER PUBLICATIONS

Machine translation of JP-2004215433-A, orig. pub. Jul. 29, 2004. (Year: 2004).*

*Primary Examiner* — Fred E Finch, III
(74) *Attorney, Agent, or Firm* — Tung & Associates

(57) ABSTRACT

A power supply system includes a power factor correction converter circuit and an isolated power converter circuit, wherein the power factor correction converter circuit corrects the power factor of a rectified power to generate a first output power, and the isolated power converter circuit converts the first output power to generate a second output power. The isolated power converter circuit includes a transformer, and the transformer includes a primary winding, a secondary winding, and an auxiliary winding. The auxiliary winding generates an auxiliary voltage which is related to the second output power. When the auxiliary voltage is lower than a disabled threshold, indicating that the voltage of the second output power is lower than a threshold, the power factor correction converter circuit provides a bypassing connection from the rectified power to the first output power and stops correcting the power factor of the rectified power.

4 Claims, 17 Drawing Sheets

(51) Int. Cl.
*H02M 3/335* (2006.01)
*H02M 1/10* (2006.01)

(52) U.S. Cl.
CPC ...... *H02M 1/4225* (2013.01); *H02M 3/33523* (2013.01); *H02M 3/33569* (2013.01)

(56) References Cited

U.S. PATENT DOCUMENTS

| | | | |
|---|---|---|---|
| 2014/0285103 A1* | 9/2014 | Acharya | H05B 45/395 315/206 |
| 2016/0043634 A1* | 2/2016 | Bemat | G06F 1/26 713/300 |
| 2020/0144905 A1* | 5/2020 | Takeda | H02M 3/158 |
| 2020/0251991 A1* | 8/2020 | Nate | H02M 3/156 |
| 2023/0421055 A1* | 12/2023 | Kang | H02M 3/335 |

* cited by examiner

POWER SUPPLY SYSTEM

CROSS REFERENCE

The present invention claims priority to U.S. 63/312,405 filed on Feb. 22, 2022 and claims priority to TW 111125979 filed on Jul. 11, 2022.

BACKGROUND OF THE INVENTION

Field of Invention

The present invention relates to a power supply system, in particular to a power supply system having a good balance between power factor correction and power consumption.

Description of Related Art

According to the protocol of the latest universal serial bus power delivery (USB PD) extend power range (EPR), the maximum output power of the current USB PD charger can reach 240 watts (W), wherein the maximum output voltage is 48 volts (V), and the maximum output current is 5 amperes (A). According to the harmonic current interference specification (IEC61000-3-2), USB PD chargers with output power higher than 75 W must include a power factor correction converter (PFC converter) to correct the power factor of the input power, thereby minimizing line-frequency harmonics. However, when the output power of the USB PD charger is lower than 75 W, the power factor correction converter will cause the USB PD charger to consume additional power.

In view of this, to address the shortcoming of the conventional art, the present invention proposes a power supply system which disables the power factor correction converter to stop correcting the power factor of the input power when the output power of the power supply system is lower than an output power threshold (for example, less than 75 watts), whereby the power consumption of the power supply system can be reduced.

SUMMARY OF THE INVENTION

From one perspective, the present invention provides a power supply system, including: a power factor correction converter circuit, configured to correct a power factor of a rectified power to generate a first output power; and an isolated power converter circuit, configured to convert the first output power to generate a second output power, the isolated power converter circuit comprising: a transformer, comprising a primary winding, a secondary winding, and an auxiliary winding which are coupled to one another, wherein the auxiliary winding is configured to generate an auxiliary voltage and the auxiliary voltage is relevant to the second output power; a primary side switching circuit, coupled to the primary winding and the first output power; and a secondary side switching circuit, coupled to the secondary winding and the second output power; wherein, when the auxiliary voltage is lower than a disable threshold, indicating that a voltage of the second output power is lower than an output voltage threshold, the power factor correction converter circuit provides a bypassing connection from the rectified power to the first output power and stops correcting the power factor of the rectified power, thereby reducing a power consumption of the power supply system.

In one embodiment, the power factor correction converter circuit comprises: a boost power stage circuit, comprising an inductor and a plurality of switches coupled to one another, wherein the inductor is coupled between the rectified power and a switching node; and a power factor correction control circuit, configured to control at least one of the switches to switch the inductor, thereby converting the rectified power to generate the first output power; wherein when the auxiliary voltage is lower than the disable threshold, the power factor correction control circuit controls at least one of the switches to provide the bypassing connection from the rectified power to the first output power and stop correcting the power factor of the rectified power.

In one embodiment, the switches comprise a high-side switch and a low-side switch, the high-side switch being coupled between the switching node and the first output power, and the low-side switch being coupled between the switching node and a ground potential; wherein when the auxiliary voltage is lower than the disable threshold, the power factor correction control circuit controls the high-side switch to be on and the low-side switch to be off, thereby providing the bypassing connection from the rectified power to the first output power and stopping correcting the power factor of the rectified power.

In one embodiment, the boost power stage circuit further comprises a bypass switch, and the bypass switch is coupled between the rectified power and the first output power; wherein when the auxiliary voltage is lower than the disable threshold, the power factor correction control circuit controls the bypass switch to be on, thereby providing the bypassing connection from the rectified power to the first output power and stopping correcting the power factor of the rectified power.

In one embodiment, the power supply system further includes an auxiliary diode, configured to rectify the auxiliary voltage to generate a rectified auxiliary voltage; and an auxiliary capacitor, configured to filter the rectified auxiliary voltage; wherein the rectified auxiliary voltage is used to provide the power required by the power factor correction control circuit during operation, and/or the power factor correction control circuit determines whether the auxiliary voltage is lower than the disable threshold according to the rectified auxiliary voltage.

In one embodiment, the power supply system further includes a voltage divider circuit configured to divide the auxiliary voltage to generate a sensed voltage, wherein the power factor correction control circuit determines whether the auxiliary voltage is lower than the disable threshold according to the sensed voltage.

In one embodiment, the power factor correction control circuit further includes a sample-and-hold circuit configured to sample and hold the auxiliary voltage at a falling edge of the auxiliary voltage to generate an auxiliary sample-and-hold voltage, wherein the power factor correction control circuit determines whether the auxiliary voltage is lower than the disable threshold according to auxiliary sample-and-hold voltage.

In one embodiment, the power factor correction control circuit determines whether the auxiliary voltage is lower than the disable threshold after a delay time from a rising edge of the auxiliary voltage.

In one embodiment, the isolated power converter circuit complies with a power supply specification, so that the second output power has an output current upper limit, wherein the output voltage threshold is calculated from an output power threshold and the output current upper limit.

In one embodiment, the power supply system further includes a bus control circuit conforming to the universal serial bus power supply specification, wherein when the power supply system and a load device are coupled to each other through a bus, the bus control circuit adjusts the voltage of the second output power according to at least one command sent by the load device through the bus; wherein when the auxiliary voltage is lower than the disable threshold, indicating that the voltage of the second output power is lower than an output voltage threshold, this also indicates that a power of the second output power is lower than the output power threshold.

In one embodiment, the power supply system further includes a secondary side control circuit configured to control the isolated power converter circuit to adjust the voltage of the second output power according to the command.

In one embodiment, the isolated power converter circuit is a flyback power converter, an asymmetrical half-bridge flyback power converter, and a half-bridge inductor-inductor-capacitive flyback power converter or a full-bridge inductor-inductor-capacitor flyback power converter.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
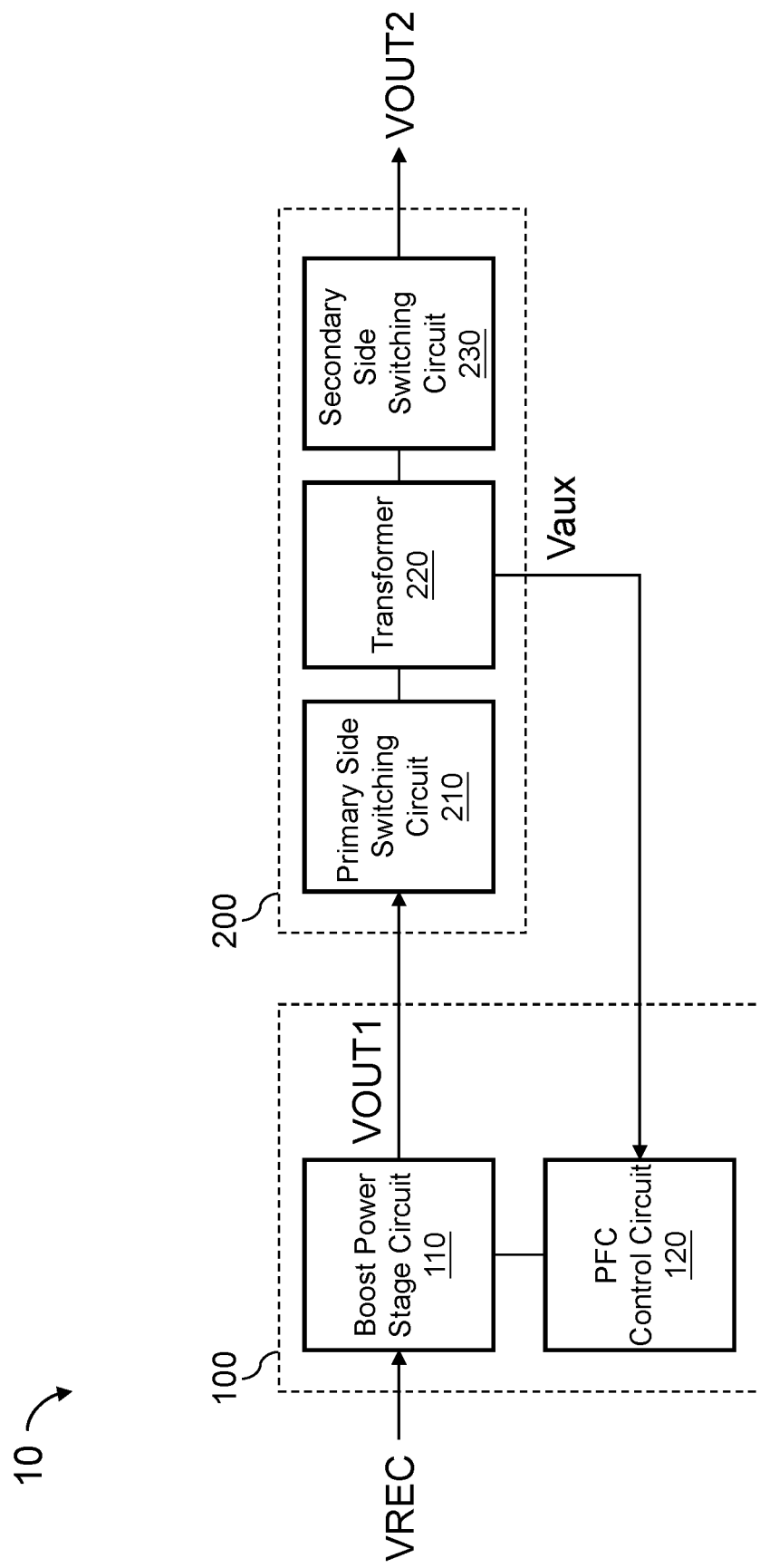
FIG. 1 is a block diagram of a power supply system according to an embodiment of the present invention.

Please refer to FIG. 1. FIG. 1 is a block diagram of a power supply system 10 according to an embodiment of the present invention. As shown in FIG. 1, the power supply system 10 includes a power factor correction converter circuit 100 and an isolated power converter circuit 200, wherein the power factor correction converter circuit 100 is configured to correct the power factor (PF) of a rectified power VREC to generate a first output power VOUT1, and the isolated power converter circuit 200 is configured to convert the first output power VOUT1 to generate a second output power VOUT2. The respective structures and functions of the power factor correction converter circuit 100 and the isolated power converter circuit 200 will be explained in detail below.

Figure 2:
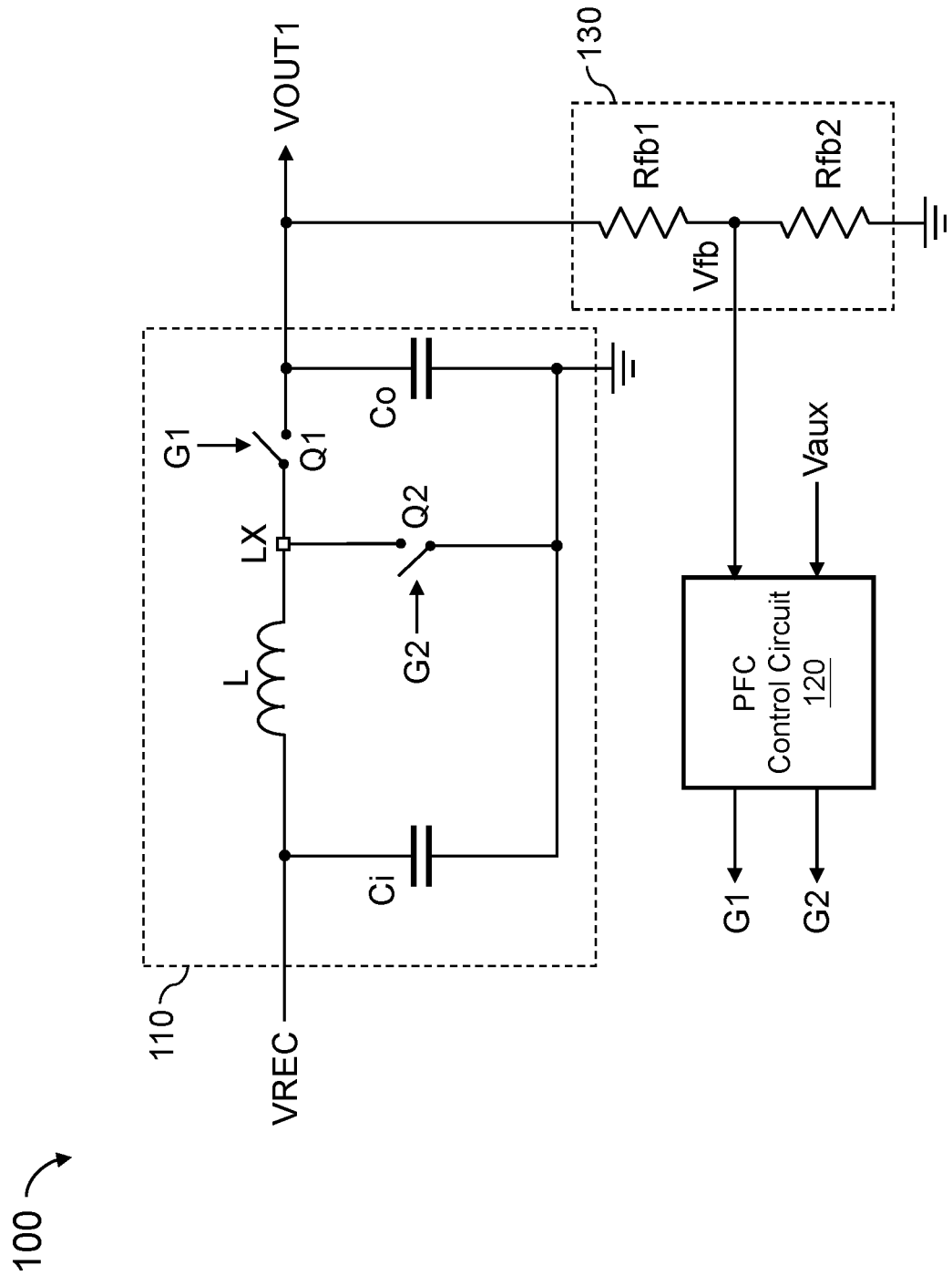
FIG. 2 is a schematic circuit diagram of a power factor correction converter circuit according to an embodiment of the present invention.

Please refer to FIG. 2. FIG. 2 is a schematic circuit diagram of a power factor correction converter circuit 100 according to an embodiment of the present invention, wherein the power factor correction converter circuit 100 includes a boost power stage circuit 110 and a power factor correction control circuit 120. As shown in FIG. 2, in some embodiments, the boost power stage circuit 110 includes an input capacitor Ci, an inductor L, a high-side switch Q1, a low-side switch Q2, and an output capacitor Co. The input capacitor Ci is coupled between the rectified power VREC and ground; the inductor L is coupled between the rectified power VREC and a switching node LX; the high-side switch Q1 is coupled between the switching node LX and the first output power VOUT1; the low-side switch Q2 is coupled between the switching node LX and ground; and the output capacitor Co is coupled between the first output power VOUT1 and ground.

In some embodiments, the power factor correction converter circuit 100 further includes a feedback circuit 130, wherein the feedback circuit 130 is configured to generate a feedback voltage Vfb according to the first output power VOUT1, and there is a proportional relationship between a voltage of the first output power VOUT1 and the feedback voltage Vfb. As shown in FIG. 2, in some embodiments, the feedback circuit 130 includes two resistors Rfb1, Rfb2, wherein the resistances of the resistor Rfb1 and the resistor Rfb2 determine the proportional relationship between the voltage of the first output power VOUT1 and the feedback voltage Vfb. For example, when the resistance of the resistor Rfb1 is 4 kiloohms (kΩ) and the resistance of the resistor Rfb2 is 1 kiloohm, the proportional relationship between the voltage of the first output power VOUT1 and the feedback voltage Vfb is 5 to 1, that is, the voltage of the first output power VOUT1 is 5 times of the feedback voltage Vfb.

Figure 3:
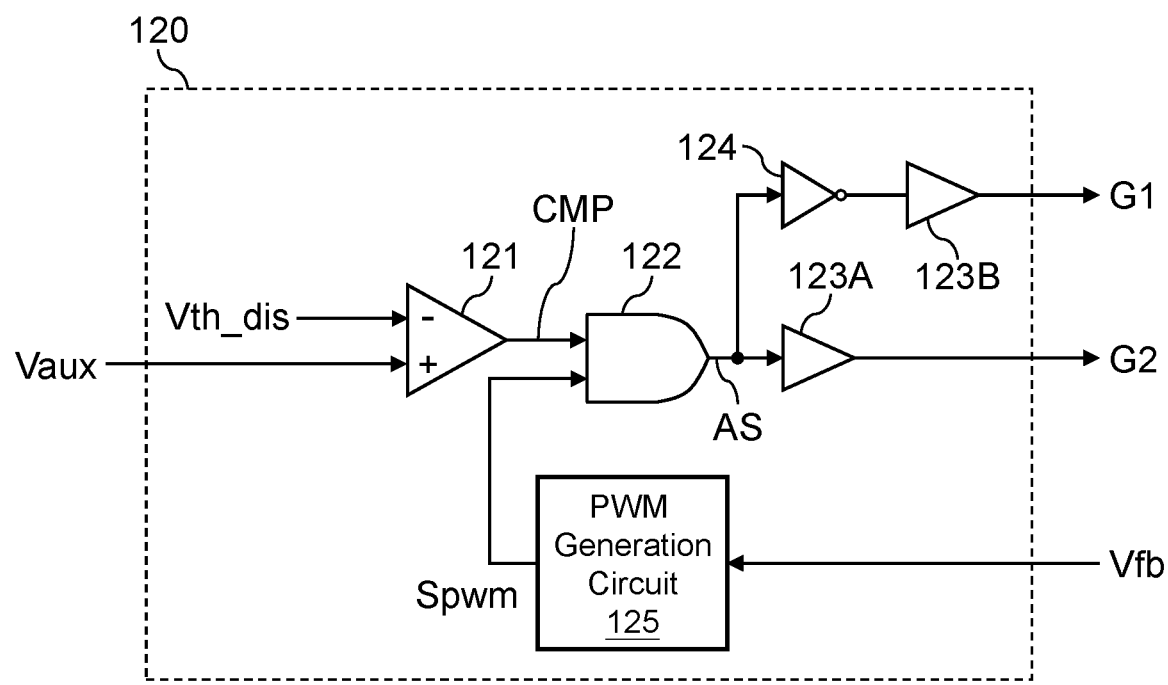
FIG. 3 is a schematic circuit diagram of a power factor correction control circuit according to an embodiment of the present invention.

Please refer to FIG. 3. FIG. 3 is a schematic circuit diagram of the power factor correction control circuit 120 according to an embodiment of the present invention, wherein the power factor correction control circuit 120 is configured to generate control signals G1 and G2 to control the high-side switch Q1 and the low-side switch Q2, respectively, so as to switch the inductor L to convert the rectified power VREC into the first output power VOUT1. As shown in FIG. 3, in some embodiments, the power factor correction control circuit 120 includes a comparator 121, an AND gate 122, plural buffers 123A and 123B, an inverter 124, and a pulse width modulation generation circuit 125. The comparator 121 is configured to compare an auxiliary voltage Vaux and a disable threshold Vth_dis to generate a comparison signal CMP; the AND gate 122 is configured to generate an AND gate signal AS according to the comparison signal CMP and a pulse width modulation signal Spwm; the buffer 123A is configured to receive the AND gate signal AS to generate the control signal G2; the buffer 123B and the inverter 124 are configured to receive the AND gate signal AS to generate the control signal G1; and the pulse width modulation generation circuit 125 is configured to receive the feedback voltage Vfb to generate the pulse width modulation signal Spwm.

Figure 4:
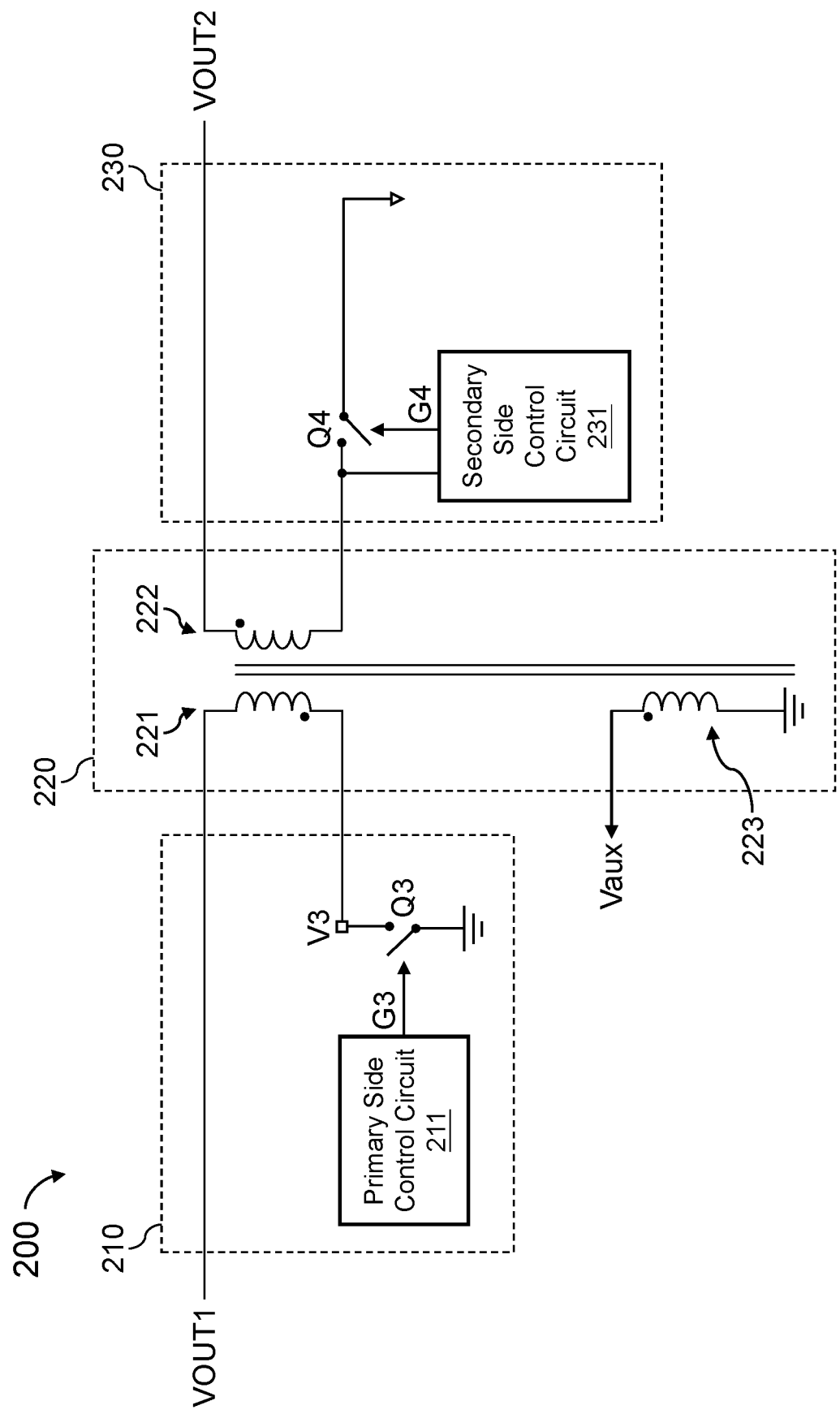
FIG. 4 is a schematic circuit diagram of an isolated power converter circuit according to an embodiment of the present invention.

Please refer to FIG. 4. FIG. 4 is a schematic circuit diagram of an isolated power converter circuit 200 according to an embodiment of the present invention, wherein the isolated power converter circuit 200 includes a primary side switching circuit 210, a transformer 220, and a secondary side switching circuit 230. As shown in FIG. 4, in some embodiments, the primary side switching circuit 210 includes a primary side control circuit 211 and a primary side switch Q3; the transformer 220 includes a primary winding 221, a secondary winding 222, and an auxiliary winding 223; the secondary side switching circuit 230 includes a secondary side control circuit 231 and a secondary side switch Q4. The primary side switching circuit 210 is coupled to the primary winding 221 and the first output power VOUT1, and the secondary side switching circuit 230 is coupled to the secondary winding 222 and the second output power VOUT2. The isolated power converter circuit 200 converts the first output power VOUT1 into the second output power VOUT2 through the primary winding 221 and the secondary winding 222 of the transformer 220, wherein the first output power VOUT1 and the second output power VOUT2 have a proportional relationship, and the proportional relationship is related to the turn ratio between the primary winding 221 and the secondary winding 222. A transformer is a well known component to those with ordinary knowledge in this technical field, and thus it is not redundantly explained in detail herein.

In some embodiments, when the isolated power converter circuit 200 converts the first output power VOUT1 to the second output power VOUT2, the primary side control circuit 211 is configured to generate a control signal G3 to control a conduction state of the primary side switch Q3, and the secondary side control circuit 231 is configured to generate a control signal G4 to control a conduction state of the secondary side switch Q4, wherein the secondary side control circuit is a synchronous rectification controller to improve the power conversion efficiency. When the primary side switch Q3 is turned on, a first output current of the first output power VOUT1 stores energy into the primary side winding 221. Meanwhile, the control signal G4 generated by the secondary side control circuit 231 controls the secondary side switch Q4 to be off. When the primary side switch Q3 is off, a secondary side induced current is generated by the secondary side winding 222 and flows through a body diode of the secondary side switch Q4. The secondary side control circuit 231 senses the generation of the secondary side induced current according to the change of a drain voltage of the secondary side switch Q4, and accordingly generates the control signal G4 to turn on the secondary side switch Q4.

Figure 5:
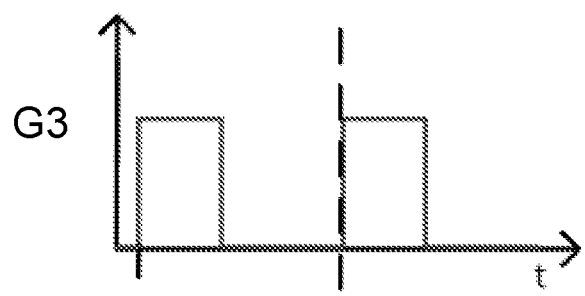
FIG. 5 is a voltage waveform diagram of an isolated power converter circuit according to an embodiment of the present invention.
Figure 5:
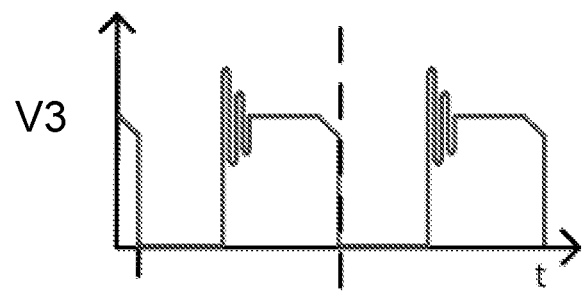
Figure 5:
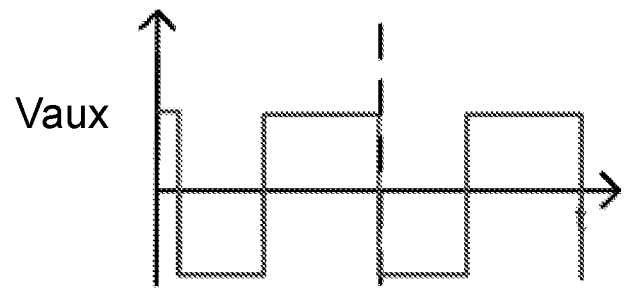
Figure 5:
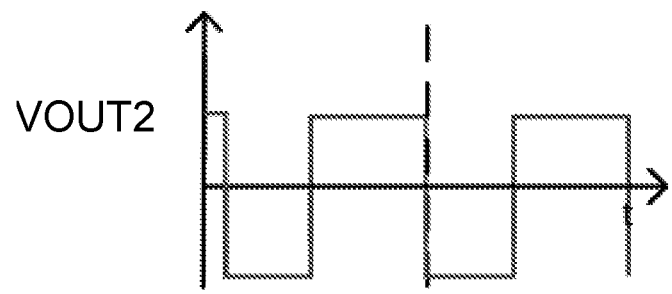

In some embodiments, the auxiliary winding 223 of the transformer 220 is configured to generate the auxiliary voltage Vaux, wherein the auxiliary voltage Vaux is relevant to the second output power VOUT2. Please refer to FIG. 5. FIG. 5 is a voltage waveform diagram of the isolated power converter circuit 200 according to an embodiment of the present invention. As shown in FIG. 5, when the control signal G3 is in a high potential state and the primary side switch Q3 is turned on, a primary side voltage V3 is grounded and is in a low potential state. Meanwhile, the voltage of the second output power VOUT2 is in a low potential state, whereby the auxiliary voltage Vaux is also in a low potential state. When the control signal G3 is in a low potential state and the primary side switch Q3 is off, the primary side voltage V3 is in a high potential state. Meanwhile, the voltage of the second output power VOUT2 is in a high potential state, whereby the auxiliary voltage Vaux is also in a high potential state.

Figure 6A:
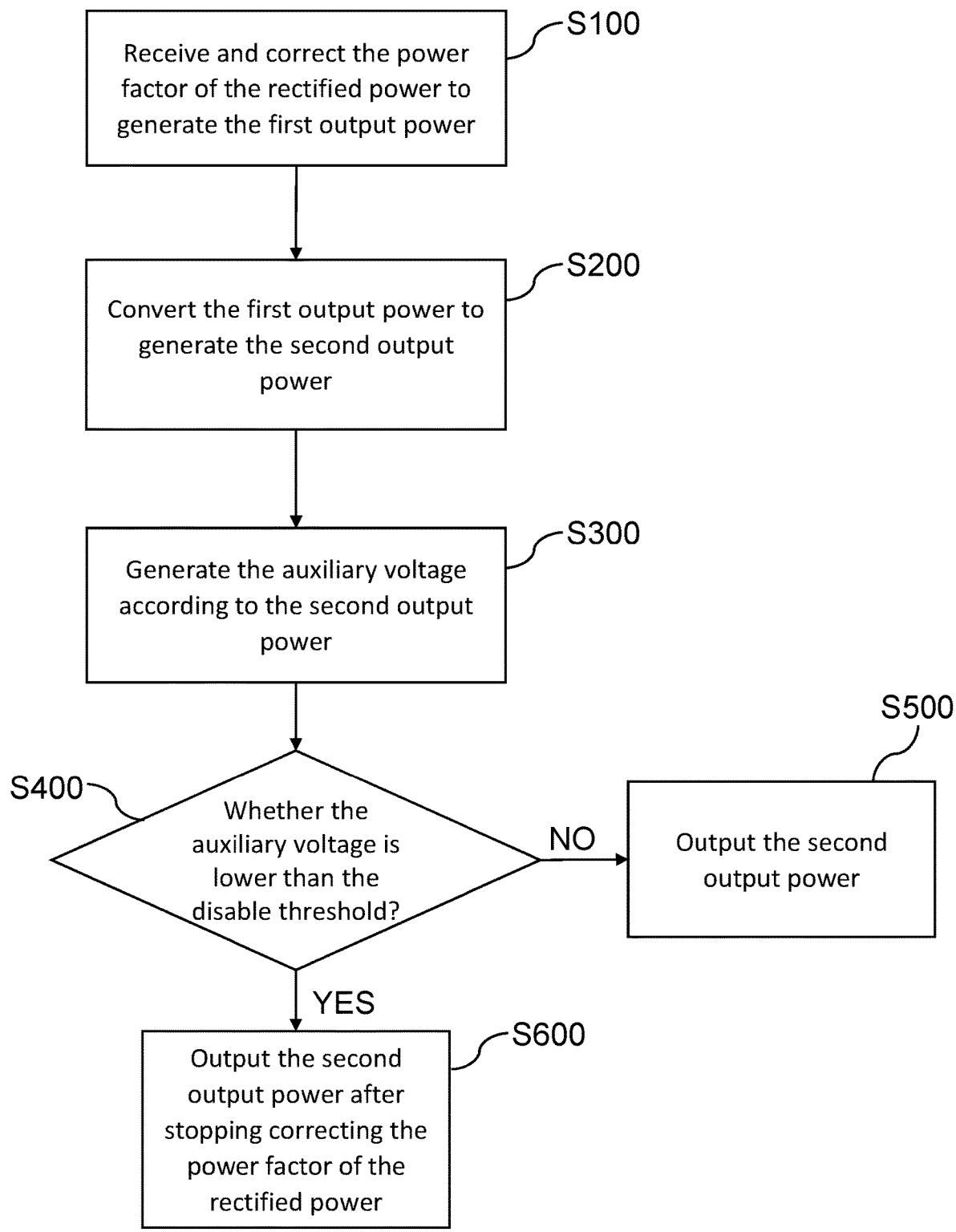
FIG. 6A is an operation flowchart (1) of the power supply system according to some embodiments of the present invention.
Figure 6B:
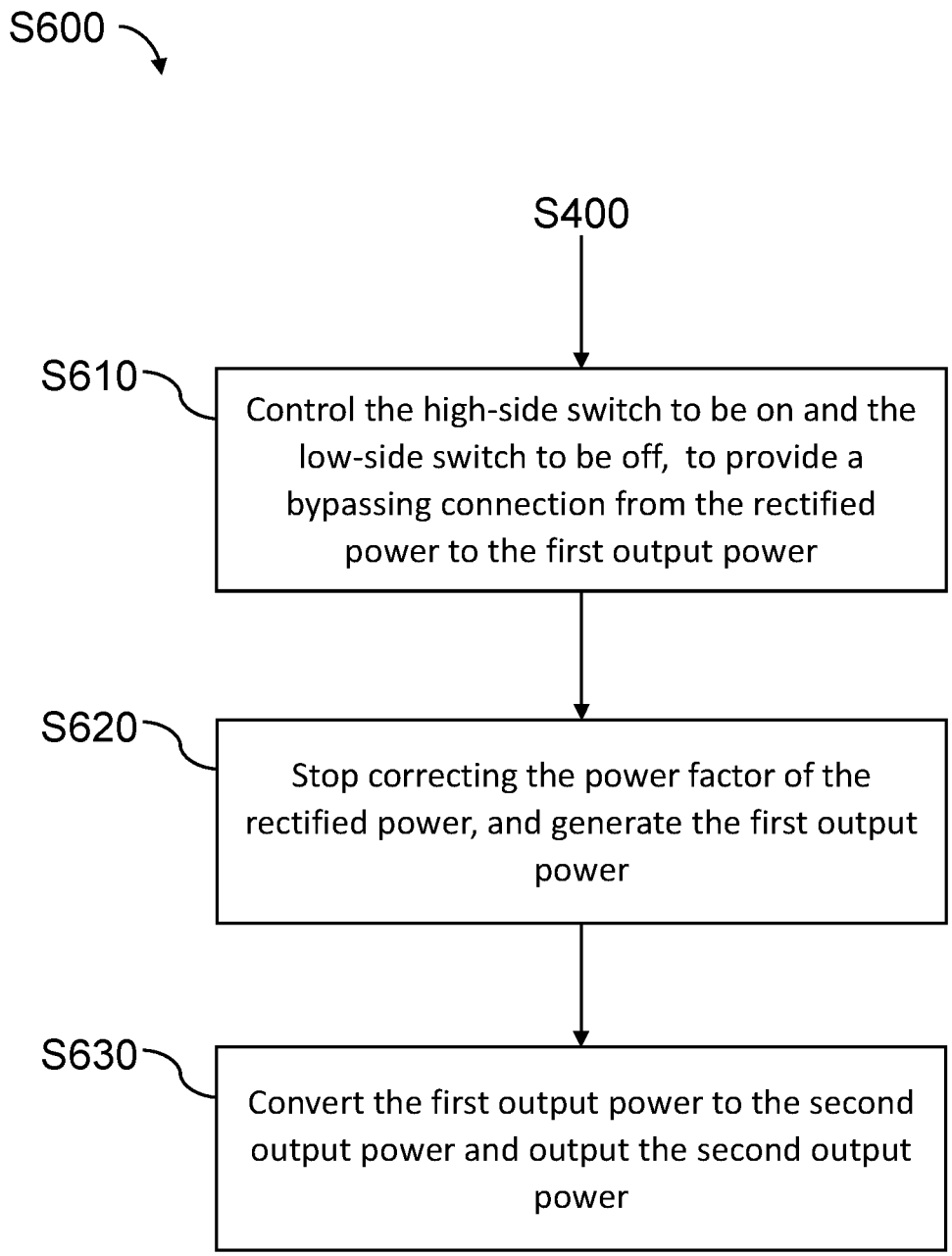
FIG. 6B is an operation flowchart (2) of the power supply system according to some embodiments of the present invention.

Please refer to FIG. 6A and FIG. 6B. FIGS. 6A and 6B are operation flowcharts of the power supply system 10 in some embodiments of the present invention. As shown in FIG. 6A, when the power supply system 10 starts operating, the power factor correction converter circuit 100 of the power supply system 10 receives and corrects the power factor of the rectified power VREC to generate the first output power VOUT1 (step S100). Subsequently, the isolated power converter circuit 200 of the power supply system 10 converts the first output power VOUT1 to generate the second output power VOUT2 (step S200), and the transformer 220 of the isolated power converter circuit 200 generates the auxiliary voltage Vaux according to the second output power VOUT2 (step S300). Then, the power factor correction control circuit 120 of the power factor correction converter circuit 100 determines whether the auxiliary voltage Vaux is lower than the disable threshold Vth_dis (step S400). Whether the auxiliary voltage Vaux is lower than the disable threshold Vth_dis indicates whether the voltage value of the second output power VOUT2 is lower than an output voltage threshold. If not, the isolated power converter circuit 200 will directly output the second output power VOUT2 (step S500); if yes, the isolated power converter circuit 200 will output the second output power VOUT2 after the power factor correction control circuit 120 stops correcting the power factor of the rectified power VREC (step S600).

In some embodiments, the isolated power converter circuit 200 complies with a power supply specification, wherein the specification defines an output current upper limit for the second output power VOUT2, and the aforementioned output voltage threshold is calculated from an output power threshold and the output current upper limit, wherein the output power threshold defines the lower limit to correct the power factor of the input power by a power factor correction converter; that is, when the output power of the second output power VOUT2 is higher than the output power threshold, the power factor correction converter operates to correct the power factor of the input power. For example, assuming that the power supply specification defines the output current upper limit of the second output power VOUT2 to be 5 amperes, and that the output power threshold of the second output power VOUT2 is 100 watts (indicating that when the output power of the second output power VOUT2 is higher than 100 W, the power factor of the input power should be corrected by a power factor correction converter), according to the output power threshold and the output current upper limit, the output voltage threshold is calculated to be 20 volts. That is to say, when the isolated power converter circuit 200 complies with the power supply specification, if the voltage of the second output power VOUT2 is lower than the output voltage threshold, this indicates that the power of the second output power VOUT2 is lower than the output power threshold. When the power of the second output power VOUT2 is lower than the output power threshold, according to the present invention, the rectified power VREC can be directly provided to the first output power VOUT1, bypassing (and stopping) the power factor correction of the rectified power, thereby reducing power consumption of the power supply system.

As shown in FIG. 6B, when the power factor correction control circuit 120 stops correcting the power factor of the rectified power VREC and outputs the second output power VOUT2 (corresponding to step S600), the power factor correction control circuit 120 controls the high-side switch Q1 to be on and the low-side switch Q2 to be off, so as to provide a bypassing connection from the rectified power VREC to the first output power VOUT1 through the inductor L (step S610). In this way, the power factor correction control circuit 120 stops correcting the power factor of the rectified power VREC, and the boost power stage circuit 110 of the power factor correction converter circuit 100 generates the first output power VOUT1 with uncorrected power factor according to the rectified power supply VREC with uncorrected power factor (step S620). Next, the isolated power converter circuit 200 converts the first output power VOUT1 with uncorrected power factor to generate the second output power VOUT2 and output the second output power VOUT2 with uncorrected power factor (step S630).

Figure 7:
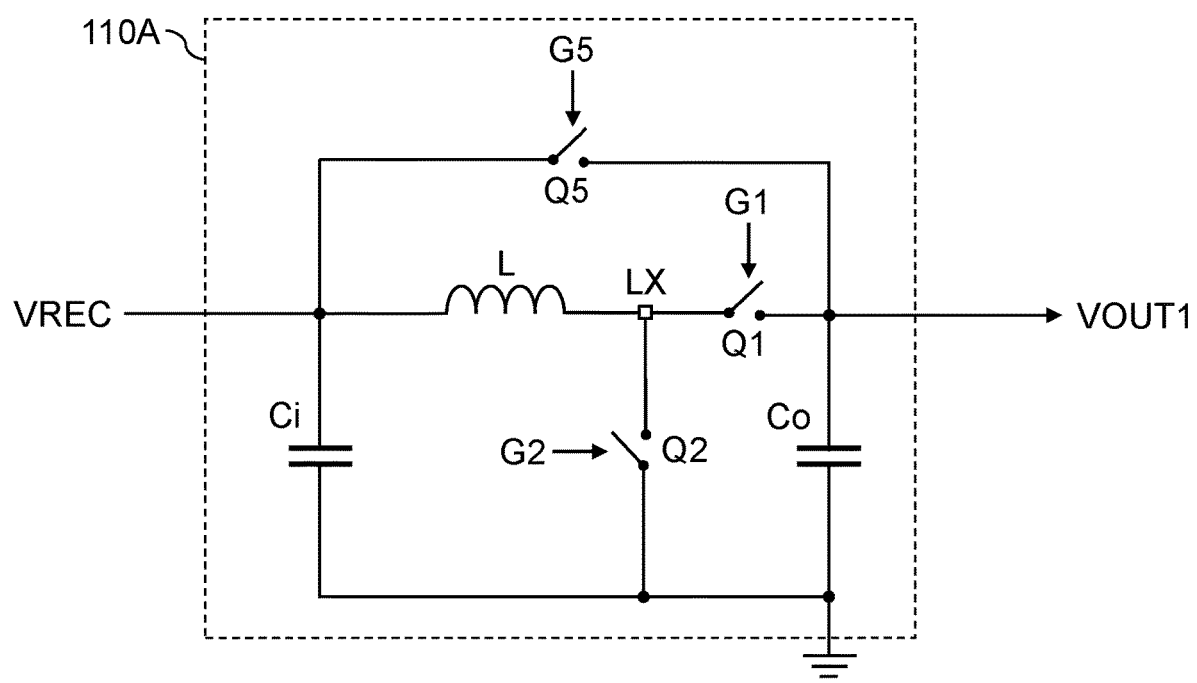
FIG. 7 is a schematic circuit diagram of a boost power stage circuit according to an embodiment of the present invention.

Please refer to FIG. 7, FIG. 7 is a schematic circuit diagram of a boost power stage circuit 110A according to an embodiment of the present invention, wherein the boost power stage circuit 110A corresponds to the boost power stage circuit 110 of FIG. 2. As shown in FIG. 7, in some embodiments, the boost power stage circuit 110A further includes a bypass switch Q5, wherein the bypass switch Q5 is coupled between the rectified power VREC and the first output power VOUT1. In some embodiments, when the power factor correction control circuit 120 determines that the auxiliary voltage Vaux is lower than the disable threshold Vth_dis, the power factor correction control circuit 120 controls the bypass switch Q5 to be on, so that the rectified power VREC and the first output power VOUT1 are directly electrically connected with each other by the bypass switch Q5 to bypass the power factor correction. In this way, the same effect of stopping the correction of the power factor of the rectified power VREC can be achieved.

Figure 8A:
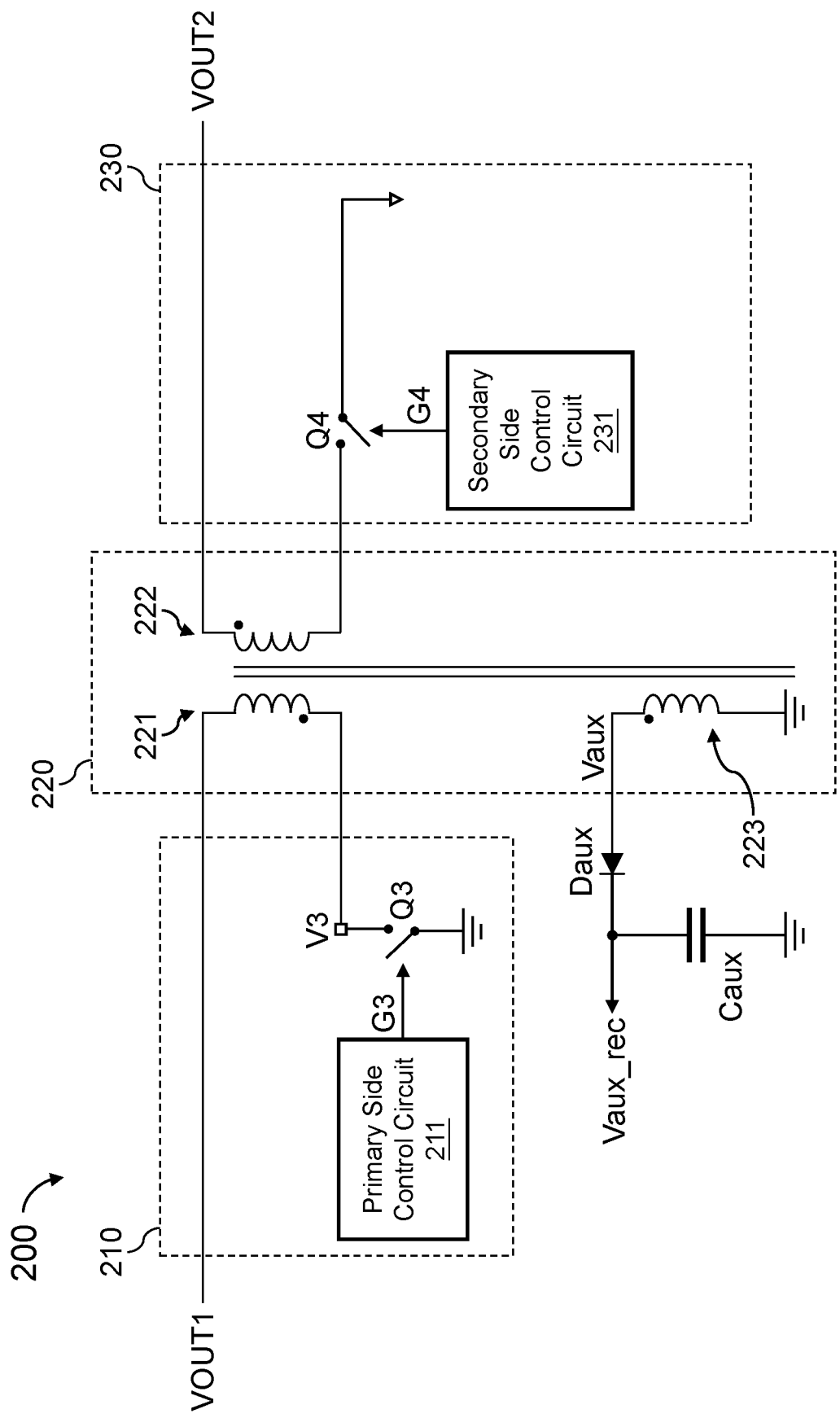
FIG. 8A is a schematic circuit diagram of an isolated power converter circuit according to another embodiment of the present invention.
Figure 8B:
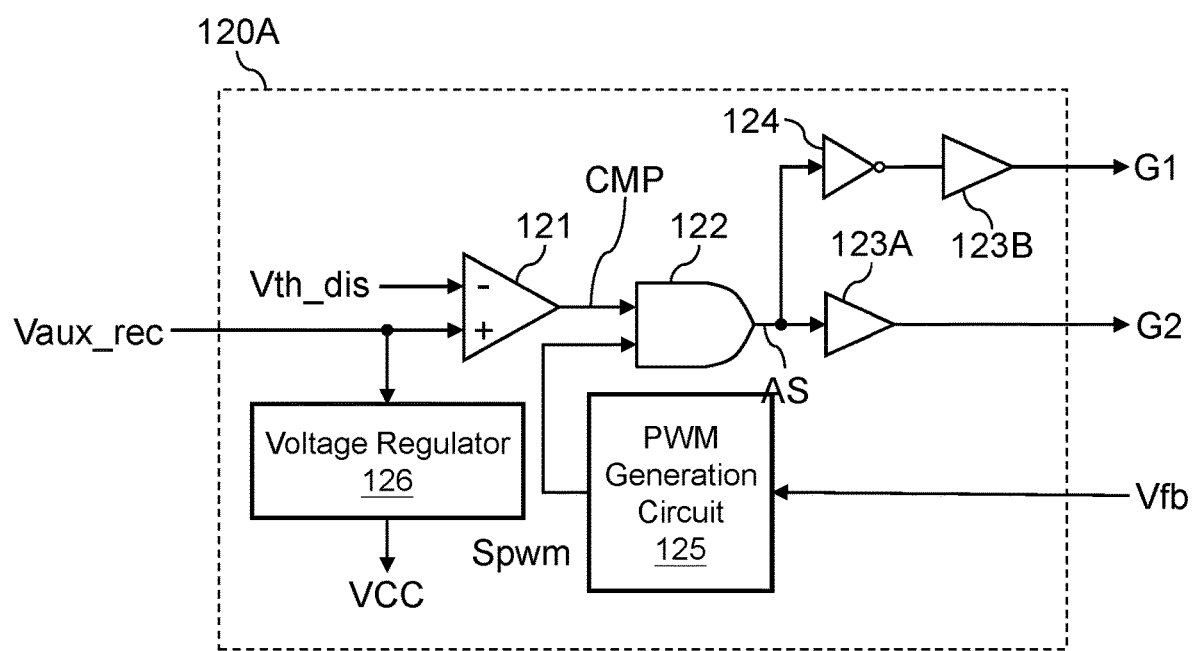
FIG. 8B is a schematic circuit diagram of a power factor correction control circuit according to another embodiment of the present invention.

Please refer to FIG. 8A, FIG. 8A is a schematic circuit diagram of the isolated power converter circuit 200 according to another embodiment of the present invention. As shown in FIG. 8A, in some embodiments, the power supply system 10 further includes an auxiliary diode Daux and an auxiliary capacitor Vaux, wherein the auxiliary diode Daux is configured to rectify the auxiliary voltage Vaux to generate a rectified auxiliary voltage Vaux_rec, and the auxiliary capacitor Vaux is configured to filter the rectified auxiliary voltage Vaux_rec. Please refer to FIG. 8B, which is a schematic circuit diagram of the power factor correction control circuit 120A according to another embodiment of the present invention, wherein the power factor correction control circuit 120A corresponds to the power factor correction control circuit 120 of FIG. 3. As shown in FIG. 8B, in some embodiments, the power factor correction control circuit 120A determines whether the auxiliary voltage Vaux is lower than the disable threshold Vth_dis according to the rectified auxiliary voltage Vaux_rec. In some embodiments, the rectified auxiliary voltage Vaux_rec is further used to provide a power supply VCC required by the power factor correction control circuit 120A during operation, wherein the power supply VCC is generated by a voltage regulator 126 by converting and rectifying the auxiliary voltage Vaux_rec. A voltage regulator is a well known circuit to those with ordinary knowledge in the technical field to which the present invention pertains, and therefore it is not explained in detail herein.

Figure 9:
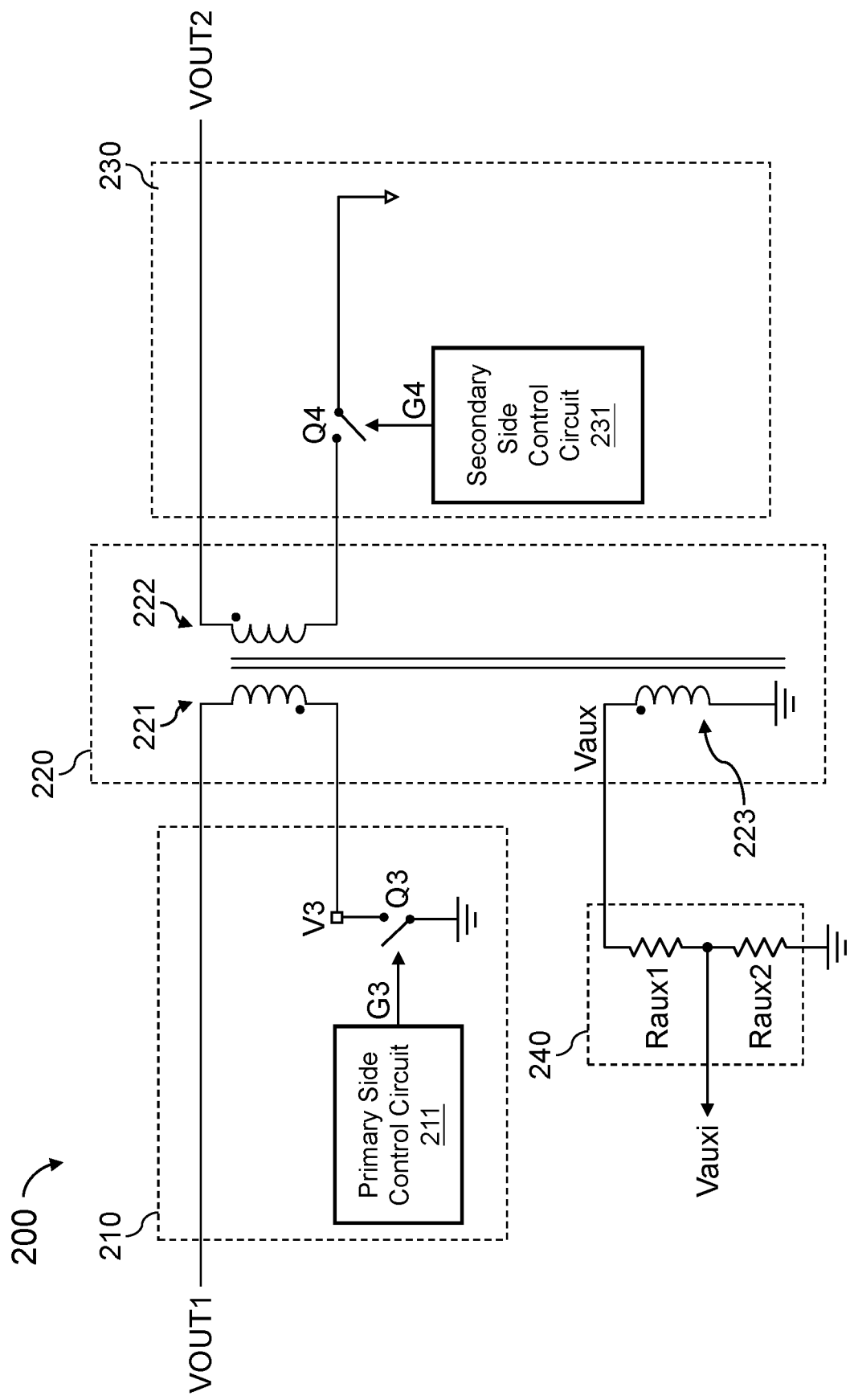
FIG. 9 is a schematic circuit diagram of the isolated power converter circuit according to another embodiment of the present invention.

In some embodiments, the power factor correction control circuit 120 determines whether the auxiliary voltage Vaux is lower than the disable threshold Vth_dis according to a sensed voltage Vauxi. Please refer to FIG. 9. FIG. 9 is a schematic circuit diagram of an isolated power converter circuit 200 according to another embodiment of the present invention. As shown in FIG. 9, in some embodiments, the power supply system 10 further includes a voltage divider circuit 240, wherein the voltage divider circuit 240 includes plural resistors Raux1 and Raux2. The resistors Raux1 and Raux2 divide the auxiliary voltage Vaux to generate the sensed voltage Vauxi, wherein the value of the auxiliary voltage Vaux is proportional to the value of the sensed voltage Vauxi, and the proportional relationship between the auxiliary voltage Vaux and the sensed voltage Vauxi is related to the proportional relationship between the value of the resistor Raux1 and the value of the resistor Raux2.

Figure 10A:
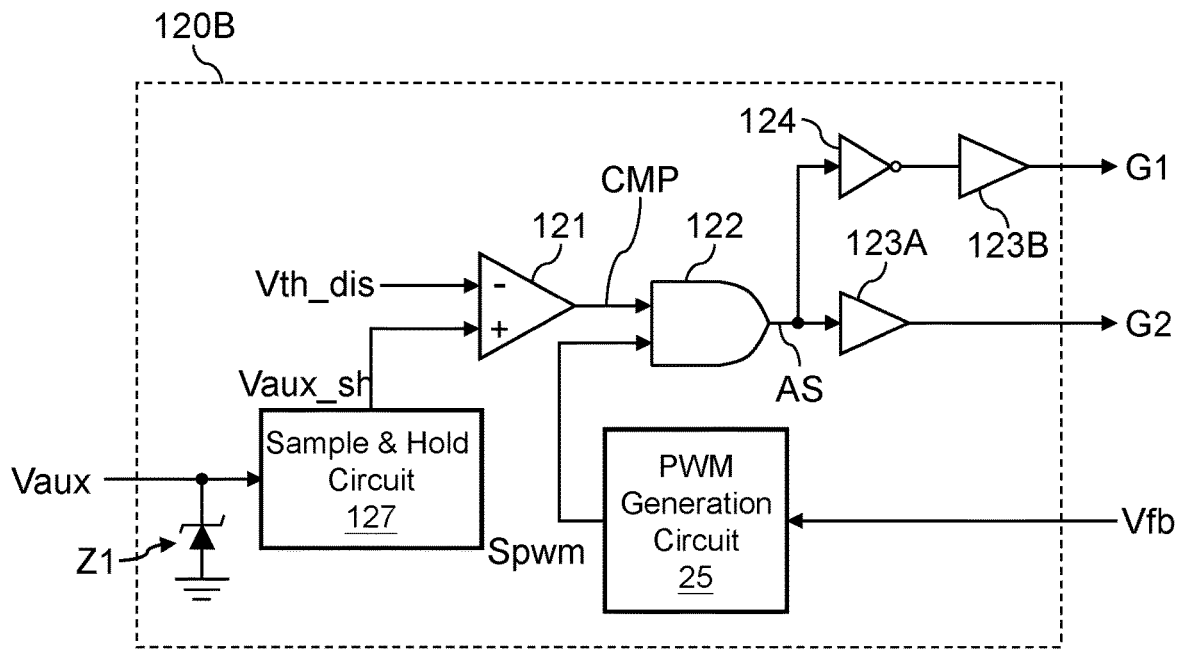
FIG. 10A is a schematic circuit diagram of the power factor correction control circuit according to another embodiment of the present invention.

Please refer to FIG. 10A, FIG. 10A is a schematic circuit diagram of the power factor correction control circuit 120B according to another embodiment of the present invention, wherein the power factor correction control circuit 120B corresponds to the power factor correction control circuit 120 of FIG. 3. As shown in FIG. 10A, in some embodiments, the power factor correction control circuit 120B further includes a Zener diode Z1 and a sample-and-hold circuit 127, wherein the Zener diode Z1 is configured to stabilize the auxiliary voltage Vaux, and the sample-and-hold circuit 127 is configured to sample and hold the auxiliary voltage Vaux (or the sensed voltage Vauxi) at a falling edge of the auxiliary voltage Vaux (or a falling edge of the sensed voltage Vauxi) to generate an auxiliary sample-and-hold voltage Vaux_sh, whereby the power factor correction control circuit 120B determines whether the auxiliary voltage Vaux is lower than the disable threshold Vth_dis according to the auxiliary sample-and-hold voltage Vaux_sh.

Figure 10B:
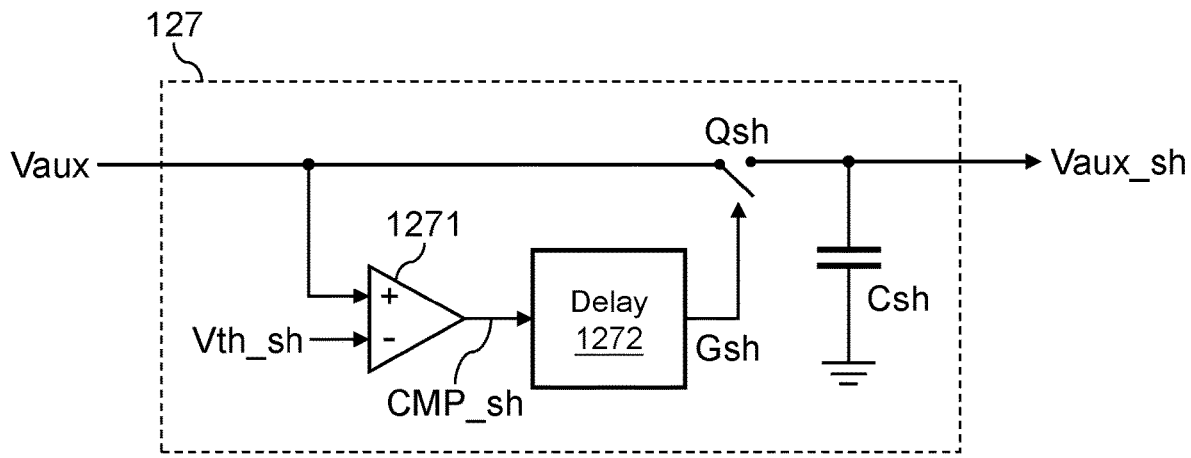
FIG. 10B is a schematic circuit diagram of a sample-and-hold circuit according to an embodiment of the present invention.

Please further refer to FIG. 10B, FIG. 10B is a schematic circuit diagram of the sample-and-hold circuit 127 according to an embodiment of the present invention. As shown in FIG. 10B, in some embodiments, the sample-and-hold circuit 127 includes a comparator 1271, a delay 1272, a sample-and-hold switch Qsh, and a sample-and-hold capacitor Csh, wherein the comparator 1271 is configured to generate a sample-and-hold comparison signal CMP_sh according to the auxiliary voltage Vaux and a sample-and-hold threshold Vth_sh; the delay 1272 is configured to delay the sample-and-hold comparison signal CMP_sh to generate a control signal Gsh to control the conduction state of the sample-and-hold switch Qsh; and the sample-and-hold capacitor Csh is configured to maintain the auxiliary sample-and-hold voltage Vaux_sh, so that the value of the auxiliary sample-and-hold voltage Vaux_sh is maintained at the peak value of the auxiliary voltage Vaux.

Figure 11A:
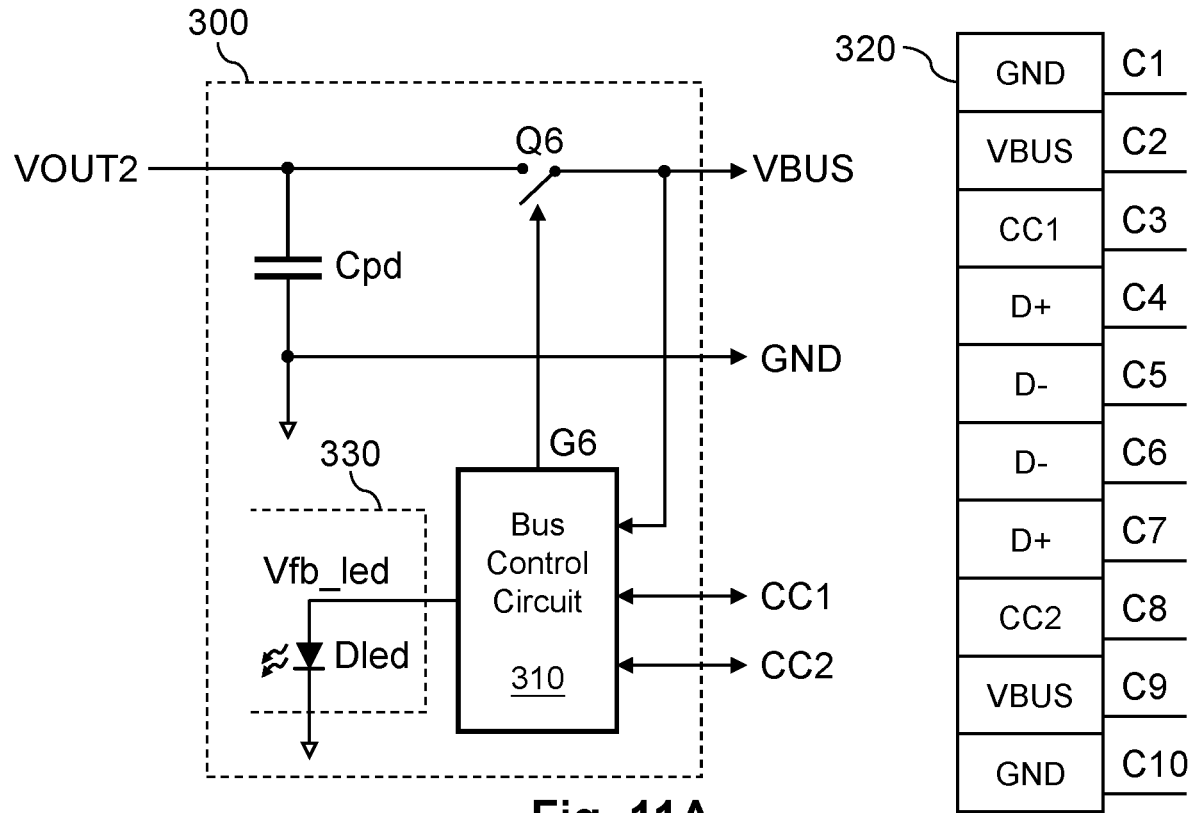
FIG. 11A is a schematic circuit diagram of a bus control circuit according to an embodiment of the present invention.

Please refer to FIG. 11A. FIG. 11A is a schematic circuit diagram of a bus control circuit 300 according to an embodiment of the present invention. As shown in FIG. 11A, in some embodiments, the power supply system 10 further includes a bus interface circuit 300 compliant with the USB PD protocol, which specifies that the output current upper limit of the second output power VOUT2 is 5 amperes. In some embodiments, the bus interface circuit 300 includes a bus control circuit 310, a bus capacitor Cpd, a bus switch Q6, and a light-emitting diode Dled, wherein when the power supply system 10 is coupled to a load device through a bus 320, the bus control circuit 310 generates a control signal G6 according to the command signals CC1 and CC2 sent by the load device through the bus 320, so as to control the conduction state of the bus switch Q6 to thereby adjust the voltage of the second output power VOUT2. In some embodiments, the secondary side control circuit 231 generates the control signal G4 to control the conduction state of the secondary side switch Q4 according to the command signals CC1 and CC2, thereby adjusting the voltage of the second output power VOUT2.

Figure 11B:
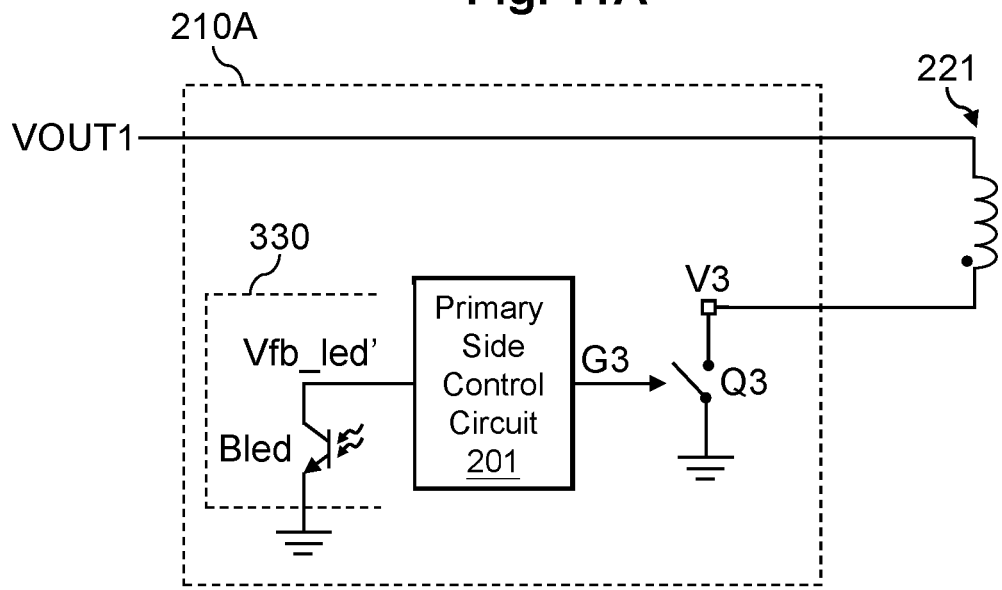
FIG. 11B is a schematic circuit diagram of a primary side switching circuit according to an embodiment of the present invention.

Please further refer to FIG. 11B. FIG. 11B is a schematic circuit diagram of the primary side switching circuit 210A according to an embodiment of the present invention, wherein the primary side switching circuit 210A corresponds to the primary side switching circuit 210 of FIG. 4. As shown in FIG. 11B, in some embodiments, the primary side switching circuit 210A further includes a light-emitting transistor Bled, wherein the light-emitting transistor Bled and the light-emitting diode Dled form an optical coupler circuit 330. The light-emitting diode Dled is configured to receive an optical coupling feedback signal Vfb_led generated by the bus control circuit 310 according to a bus power supply VBUS so as to emit light, and the light-emitting transistor Bled is configured to receive the light emitted from the light-emitting diode Dled to generate an optical coupling feedback signal Vfb_led', so that the primary side control circuit 201 can adjust the duty ratio of the control signal G3 according to the optical coupling feedback signal Vfb_led', to thereby control the conduction state of the primary side switch Q3.

Figure 12A:
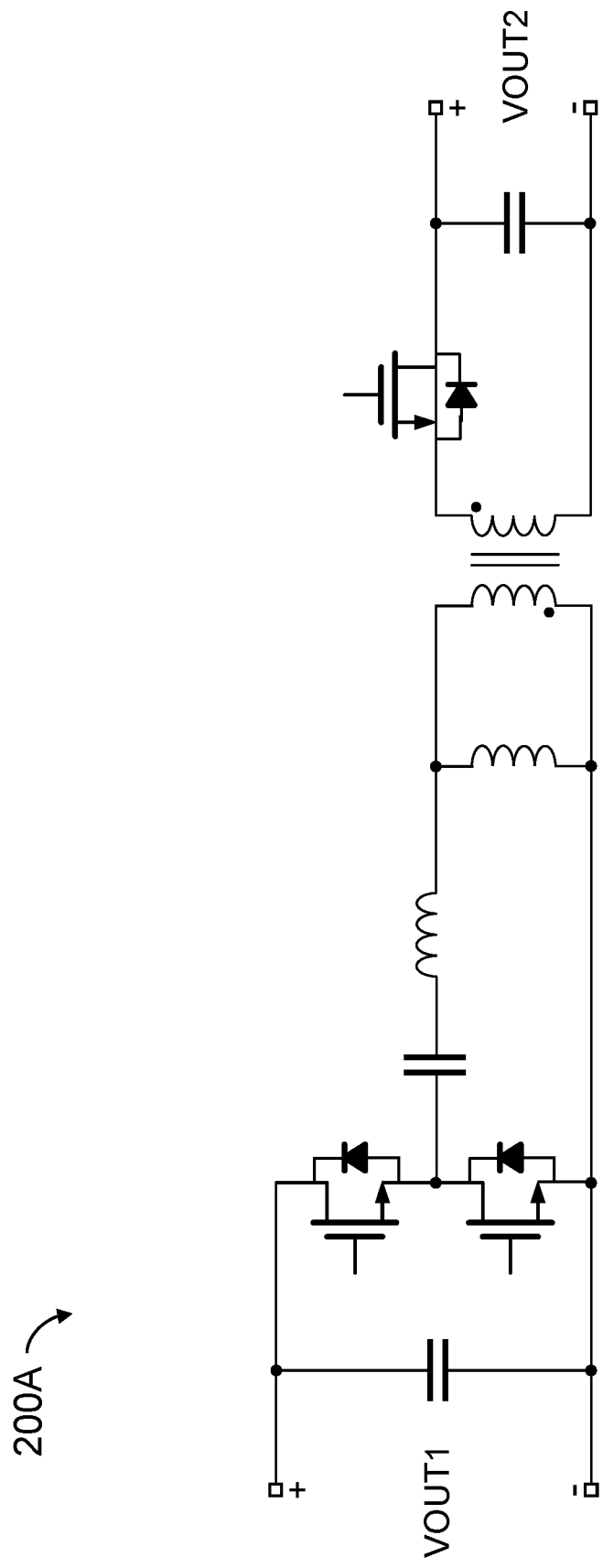
FIGS. 12A to 12C are schematic circuit diagrams of an isolated power converter circuit according to some embodiments of the present invention.
Figure 12B:
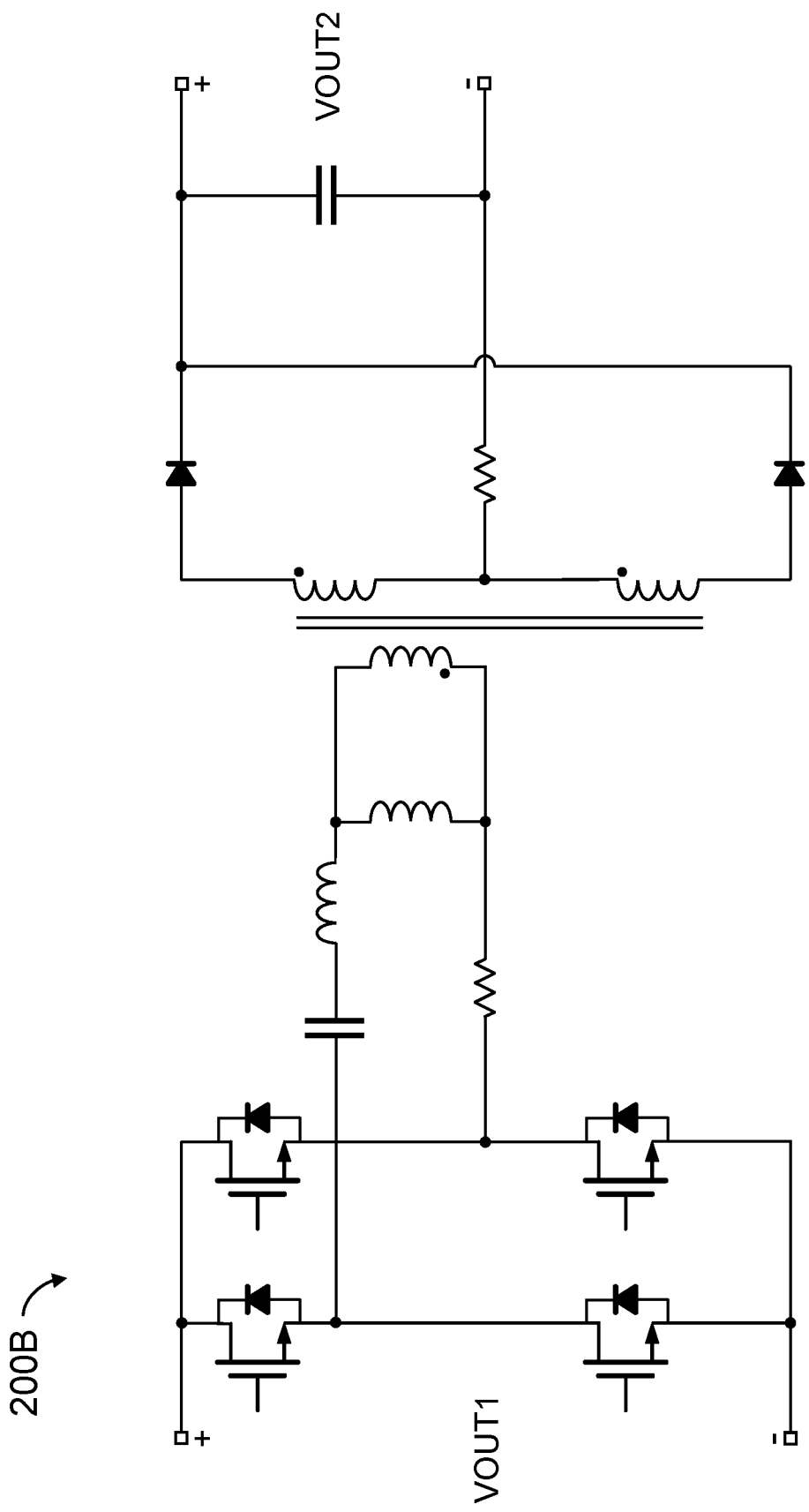
Figure 12C:
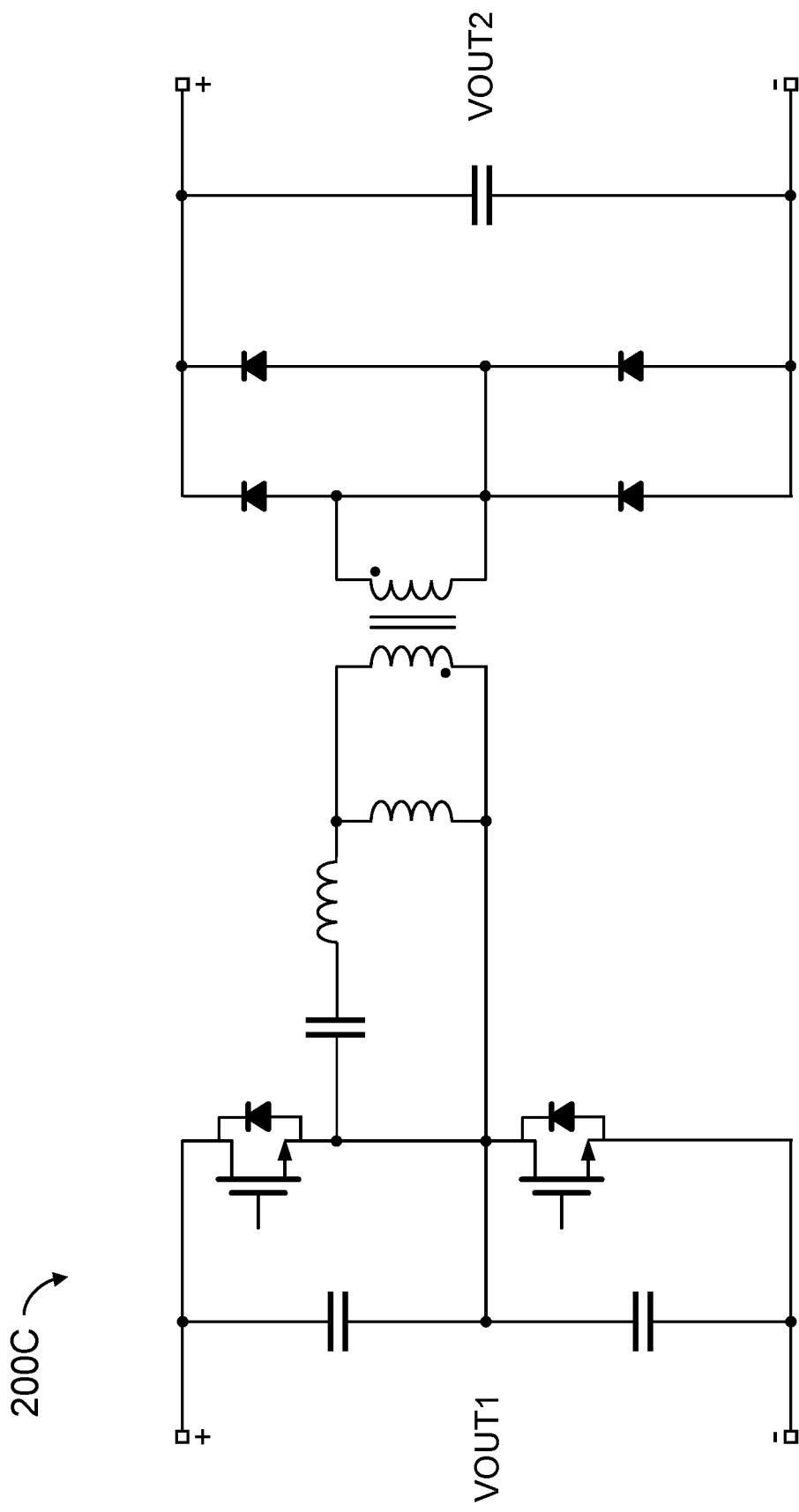

Please refer to FIGS. 12A to 12C. FIGS. 12A to 12C are schematic circuit diagrams of the isolated power converter circuit 200 according to some embodiments of the present invention. In some embodiments, the isolated power converter circuit can be, but is not limited to, a flyback power converter (as shown by the isolated power converter circuit 200 of FIG. 4), an asymmetrical half-bridge flyback power converter (as shown by the isolated power converter circuit 200A of FIG. 12A), a half-bridge inductor-inductor-capacitor flyback power converter (as shown by the isolated power converter circuit 200B of FIG. 12B), or a full-bridge inductor-inductor-capacitor flyback power converter (as shown by the isolated power converter circuit 200C of FIG. 12C). The structures and functions of the asymmetrical half-bridge flyback power converter, the half-bridge inductor-inductor-capacitor flyback power converter, and the full-bridge inductor-inductor-capacitor flyback power converter are well known to those with ordinary knowledge in the technical field to which the present invention pertains, so they will not be described in detail herein.

Figure 13:
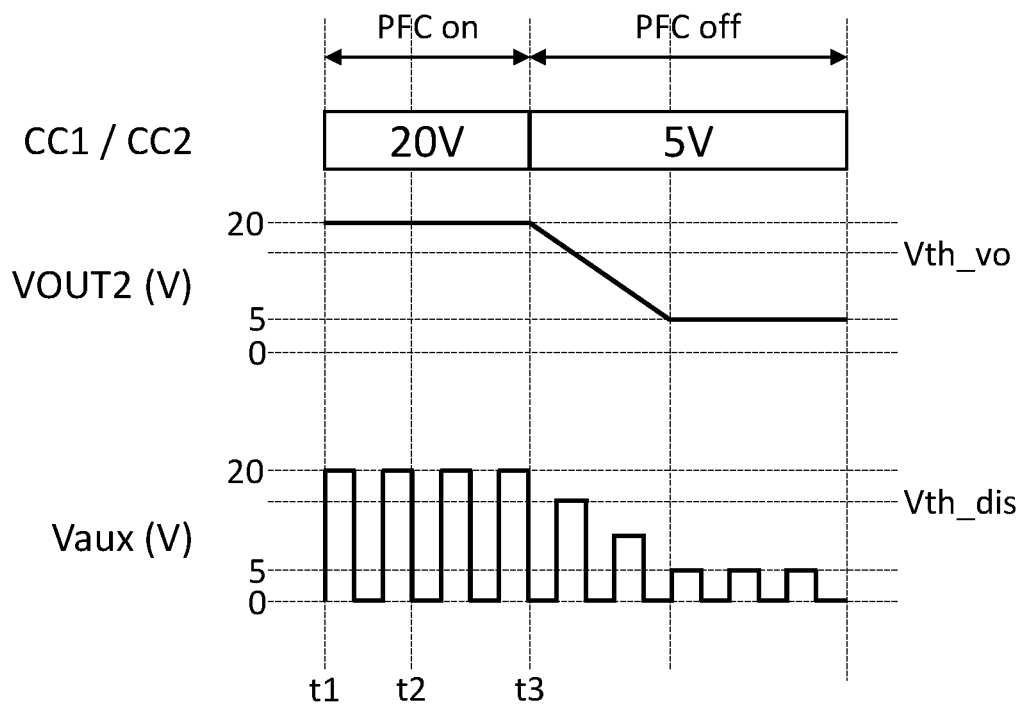
FIG. 13 is a voltage waveform diagram of a power supply system according to some embodiments of the present invention.

Please refer to FIG. 1 and FIG. 13. FIG. 13 is a voltage waveform diagram of the power supply system 10 according to an embodiment of the present invention, wherein the power supply system 10 of the present embodiment complies with the general serial bus power supply specification. As shown in FIG. 13, in some embodiments, when the power supply system 10 receives a control command to control the second output power VOUT2 at an output voltage value of 20 volts at time t1, the transformer 220 converts the first output power VOUT1 into the second output power VOUT2 with a voltage value of 20 volts, and also generates an auxiliary voltage Vaux with an amplitude of 20 volts. In this case, the value of the auxiliary voltage Vaux is higher than the disable threshold Vth_dis (for example, 15 volts), indicating that the voltage of the second output power VOUT2 is higher than the output voltage threshold Vth_vo (for example, 15 volts), which further indicates that the power of the second output power VOUT2 is higher than an output power threshold (for example, 75 watts), so the power factor correction control circuit 120 will correct the power factor of the rectified power VREC.

In some embodiments, when the power supply system 10 receives a control command to control the second output power VOUT2 at an output voltage value of 5 volts at time t3, the transformer 22 converts the first output power VOUT1 into the second output power VOUT2 with a voltage value of 5 volts, and also generates an auxiliary voltage Vaux with an amplitude of 5 volts. In this case, the value of the auxiliary voltage Vaux is lower than the disable threshold Vth_dis (for example, 15 volts), indicating that the voltage of the second output power VOUT2 is lower than the output voltage threshold Vth_vo (for example, 15 volts), which further indicates that the power of the second output power VOUT2 is lower than the output power threshold (for example, 75 watts), so the power factor correction control circuit 120 stops correcting the power factor of the rectified power VREC.

Figure 14:
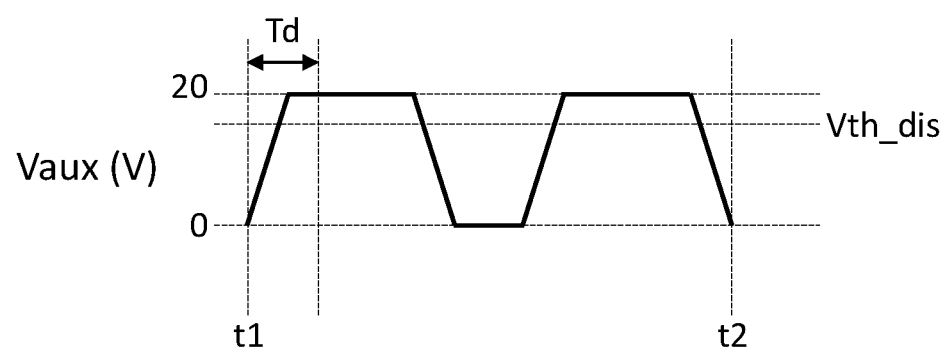
FIG. 14 is a voltage waveform diagram of an auxiliary voltage according to some embodiments of the present invention.

Please refer to FIG. 14. FIG. 14 is a voltage waveform diagram of the auxiliary voltage Vaux according to an embodiment of the present invention, wherein the waveform of FIG. 14 is an enlarged view (zoom in view) of the auxiliary voltage Vaux between the time point t1 and the time point t2 in FIG. 13. As shown in FIG. 14, in some embodiments, the power factor correction control circuit 120 determines whether the auxiliary voltage Vaux is lower than the disable threshold Vth_dis (for example, 15 volts) after a delay time Td from the rising edge of the auxiliary voltage Vaux, so as to prevent the power factor correction control circuit 120 from not receiving the correct peak value of the auxiliary voltage Vaux (20 volts), which may cause errors in judgment.

In summary, the power supply system 10 of the present invention determines whether the auxiliary voltage Vaux is lower than the disable threshold Vth_dis by the power factor correction control circuit 120, and accordingly determines whether to stop correcting the power factor of the rectified power VREC, thereby reducing the power consumption of the power supply system 10. When the auxiliary voltage Vaux is lower than the disable threshold Vth_dis, it indicates that the voltage of the second output power VOUT2 is lower than the output voltage threshold Vth_vo, and this further indicates that the power of the second output power VOUT2 is lower than an output power threshold.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply system, comprising:
   a power factor correction converter circuit, configured to correct a power factor of a rectified power to generate a first output power; and
   an isolated power converter circuit, configured to convert the first output power to generate a second output power, the isolated power converter circuit comprising:
      a transformer, comprising a primary winding, a secondary winding, and an auxiliary winding which are coupled to one another, wherein the auxiliary winding is configured to generate an auxiliary voltage and the auxiliary voltage is relevant to the second output power;
      a primary side switching circuit, coupled to the primary winding and the first output power; and
      a secondary side switching circuit, coupled to the secondary winding and the second output power;
   wherein, when the auxiliary voltage is lower than a disable threshold, indicating that a voltage of the second output power is lower than an output voltage threshold, and indicating that a power of the second output power is lower than an output power threshold, the power factor correction converter circuit provides a bypassing connection from the rectified power to the first output power and stops correcting the power factor of the rectified power, thereby reducing a power consumption of the power supply system;
   wherein the isolated power converter circuit complies with a power supply specification, so that the second output power has an output current upper limit, wherein the output voltage threshold is calculated from the output power threshold and the output current upper limit.

2. The power supply system of claim 1, wherein the power factor correction converter circuit comprises:
   a boost power stage circuit, comprising an inductor and a plurality of switches coupled to one another, wherein the inductor is coupled between the rectified power and a switching node; and
   a power factor correction control circuit, configured to control at least one of the switches to switch the inductor, thereby converting the rectified power to generate the first output power;
   wherein when the auxiliary voltage is lower than the disable threshold, the power factor correction control circuit controls at least one of the switches to provide the bypassing connection from the rectified power to the first output power and stop correcting the power factor of the rectified power.

3. The power supply system of claim 2, wherein the switches comprise a high-side switch and a low-side switch, the high-side switch being coupled between the switching node and the first output power, and the low-side switch being coupled between the switching node and a ground potential;
   wherein when the auxiliary voltage is lower than the disable threshold, the power factor correction control circuit controls the high-side switch to be on and the low-side switch to be off, thereby providing the bypassing connection from the rectified power to the first output power and stopping correcting the power factor of the rectified power.

4. The power supply system of claim 2, wherein the power factor correction control circuit determines whether the auxiliary voltage is lower than the disable threshold after a delay time from a rising edge of the auxiliary voltage.

* * * * *